(12) United States Patent
Mehta et al.

(10) Patent No.: US 6,592,699 B1
(45) Date of Patent: Jul. 15, 2003

(54) PROCESS FOR MAKING STRETCH FILM HAVING HEAT-SEALED EDGES

(75) Inventors: Deepak H. Mehta, Naperville, IL (US); John P. Wojcik, Long Grove, IL (US); Eldridge Presnell, Round Lake Beach, IL (US); Donald L. Van Erden, Wildwood, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 09/429,390

(22) Filed: Oct. 28, 1999

(51) Int. Cl.[7] .................................................. B31F 1/00
(52) U.S. Cl. ...................... 156/227; 88/459; 88/477.1; 88/494; 88/555; 428/126; 493/243; 493/442
(58) Field of Search ............................... 156/196, 202, 156/204, 216, 212, 213, 221, 222, 223, 226, 227, 229, 443, 459, 461, 477.1, 479, 494, 555, 582, 88, 308.2; 428/126, 129, 130, 192, 121; 493/186, 189, 196, 197, 205, 208, 243, 251, 257, 442, 231

(56) References Cited

U.S. PATENT DOCUMENTS

| | | | | |
|---|---|---|---|---|
| 3,660,200 A | * | 5/1972 | Anderson et al. | 156/151 |
| 3,915,787 A | * | 10/1975 | Vetter | 156/359 |
| 3,978,191 A | * | 8/1976 | Allen et al. | 156/202 |
| 4,017,251 A | | 4/1977 | Coburn et al. | 425/404 |
| 4,436,788 A | | 3/1984 | Cooper | 428/483 |
| 4,504,434 A | | 3/1985 | Cooper | 264/22 |
| 4,526,565 A | * | 7/1985 | Hummel et al. | 493/196 |
| 4,714,454 A | * | 12/1987 | Herrington | 156/583.1 |
| 4,714,455 A | * | 12/1987 | Herrington | 493/196 |
| 4,813,792 A | * | 3/1989 | Belmont et al. | 383/13 |
| 4,823,427 A | * | 4/1989 | Gibbs et al. | 15/247 |
| 4,833,172 A | * | 5/1989 | Schwarz et al. | 521/62 |
| 4,905,451 A | | 3/1990 | Jaconelli et al. | 53/410 |
| 5,112,674 A | | 5/1992 | German et al. | 428/216 |
| 5,114,763 A | | 5/1992 | Brant et al. | 428/34.9 |
| 5,147,709 A | | 9/1992 | Dohrer et al. | 428/213 |

(List continued on next page.)

FOREIGN PATENT DOCUMENTS

GB 2 038 845 7/1980

OTHER PUBLICATIONS

German, *Effect of Processing Variables on LLDPE Stretch Film Cling*, 1988 Polymers, Laminations and Coatings Conference, pp. 445–495.
DeVet, *What Are The Prospects For Metallocene LLDPE In Linear Oriented Films?*, Slide Presentation by Exxon Chemical Company, Dec., 1998.
Brant, et al., *Film Property Enhancements by Orienting EXCEED mLLDPE*, Article by Exxon Chemical Company, Sep., 1997.
PRIMPLAST, Brochure by The Dow Chemical Group.

Primary Examiner—Michael W. Ball
Assistant Examiner—Jessica Rossi
(74) Attorney, Agent, or Firm—Donald J. Breh; Mark W. Croll; Lisa M. Soltis

(57) ABSTRACT

A highly stretched film has permanently heat-sealed edges that are nearly invisible. A folding apparatus folds the edge portions of a film to form folded edges. The folded film then is passed through a bridle mechanism having two heated rolls. A series of nips apply pressure to the folded film as it is heated by the heated rolls. The nip pressure, combined with the heat imparted by the heated rolls, causes thermal welding of the folded edges resulting in permanent heat-sealed edges. Because the film edges are folded prior to the hot-stretching, the hot stretch process performs dual functions of stretching the film and heat sealing the folded edges. The resulting stretched film has permanently heat-sealed edges that do no separate, and which prevent tearing of the film edges during subsequent processing and use.

8 Claims, 3 Drawing Sheets

U.S. PATENT DOCUMENTS

| | | | |
|---|---|---|---|
| 5,234,731 A | | 8/1993 | Ferguson .................... 428/34.9 |
| 5,235,794 A | * | 8/1993 | Center ......................... 53/202 |
| 5,272,016 A | | 12/1993 | Ralph ......................... 428/516 |
| 5,279,872 A | | 1/1994 | Ralph ......................... 428/34.9 |
| 5,460,861 A | | 10/1995 | Vicik et al. ................. 428/34.9 |
| 5,531,393 A | * | 7/1996 | Salzsauler et al. ........ 242/160.4 |
| 5,538,790 A | | 7/1996 | Arvedson et al. ............ 428/349 |
| 5,565,222 A | * | 10/1996 | Scherer ....................... 156/202 |
| 5,569,693 A | | 10/1996 | Doshi et al. ................. 524/317 |
| 5,688,349 A | * | 11/1997 | Herum ....................... 156/200 |

* cited by examiner

PROCESS FOR MAKING STRETCH FILM HAVING HEAT-SEALED EDGES

FIELD OF INVENTION

This invention is directed to a highly stretched film having heat-sealed edges and a process and apparatus for making the film. The film has strong permanently heat-sealed edges that are nearly invisible. The thickness and integrity of the heat-sealed edges are controlled by the process of this invention, thereby improving the appearance of the wound roll.

BACKGROUND OF INVENTION

Various cold processes for making a film with reinforced edges are known in the art. Such reinforced films have good tear characteristics to resist tearing at the edges. These films are used particularly for securing and packaging goods for shipping.

Related art provides a cold process for providing longitudinal reinforcement to a strip of film, such as in U.S. Pat. No. 4,905,451 to Jaconelli et al. Jaconelli et al. discloses runners positioned to fold zones of a strip to overlap each other to form a zone of reinforcement.

Salzsauler et al., U.S. Pat. No. 5,531,393, discloses a cold process for making a stretch film having folded edges comprising adjustable folding finger means which cause edges of a film to be folded prior to stretching and embossing the film.

Scherer, U.S. Pat. No. 5,565,222, discloses a cold process for making a stretch film having flat, double thickness hems on opposite margins of the film.

Prior art films and the processes for making films having edges have certain disadvantages. One disadvantage is that the edges are produced by cold process whereby the films are folded to form edges. The edges are easily separable during application and/or use.

Another disadvantage is that the thickness of the edges formed during cold processes is at least twice the thickness of the center portion of the film. Also, the folded edges need to be fairly wide to prevent unfolding. As a result, films having such edges are difficult to wind onto a core for storage. Unevenly wound rolls have poor appearance and cause excessive core pressure loading which results in core failure.

A process and a film produced by such process is needed to overcome the problems associated with prior art reinforced films and the cold processes to make such films.

SUMMARY OF THE INVENTION

This invention is directed to a highly stretched film having permanently heat-sealed edges that are nearly invisible. The heat-sealed edges have a width of about 0.10 inch to about 1.0 inch. The heat-sealed edges do not separate, and prevent the film from tearing.

The film edges may be folded over once (to form a two-layer folded edge) or more than once (to form folded edges having three or more layers). In order to form the edges, a film is fed to a folding apparatus before being stretched with the aid of heat. Any folding process, which folds both edges of the film, is suitable. In one process, the film advances over a first folding roll having a length which is less than the initial width of the film. As the film advances over the first folding roll, edge portions project outwardly beyond opposite ends of the first folding roll. A second folding roll is positioned relative to the first folding roll to direct the film at an angle with respect to the initial path of the film, maintaining the film under tension. As a result of said tension, the edge portions are folded downwardly through acute angles over opposite ends of the first folding roll.

A pair of folding members are positioned between the first folding roll and the second folding roll. As the film advances across the folding members, the edge portions are folded until the edge portions are in contact with a bottom surface of the film to form folded edges. This process may be repeated if folded edges having multiple (more than two) film layers are desired.

Once the folded edges are formed, the film is fed to a high speed heating and stretching apparatus comprising a bridle mechanism having a first heated roll and a second heated roll. The folded film passes through a nip upon contacting the first heated roll. The nip pressure, combined with the heat imparted by the first and second rolls, causes thermal welding of the folded edges resulting in permanent heat-sealed folds. The strength of the heat seals is maintained and, to some extent reinforced, during the hot stretching process. Because the film is folded prior to hot stretching, the hot stretch process performs dual functions of stretching the film and heat sealing the folded edges. The resulting stretched film has permanently heat-sealed edges that do not separate, and which prevent tearing of the film edges during subsequent processing and use.

With the foregoing in mind, it is a feature and advantage of this invention to provide a highly stretched film having permanently heat-sealed edges that resist tearing and separation. The heat-sealed edges are nearly invisible. The controlled, uniform thickness of the folded edges minimizes core pressure loading and improves the wound roll appearance.

It is another feature and advantage of this invention to provide an apparatus and a high speed process for forming edges on a film, heat-sealing the edges and stretching the reinforced film by about 100–450% of its initial pre-stretched length, to an ultimate length that is about 200–550% of the initial length.

It is another feature and advantage of this invention to provide an apparatus and a high speed process for heating and stretching a reinforced film having folded edges, in which the reinforced film is fed from a bridle mechanism at a rate of up to about 2,500 fpm.

The foregoing and other features and advantages of this invention will become further apparent from the following detailed description of the preferred embodiments, read in conjunction with the drawings.

DETAILED DESCRIPTION OF THE PRESENTLY PREFERRED EMBODIMENTS

Figure 1:
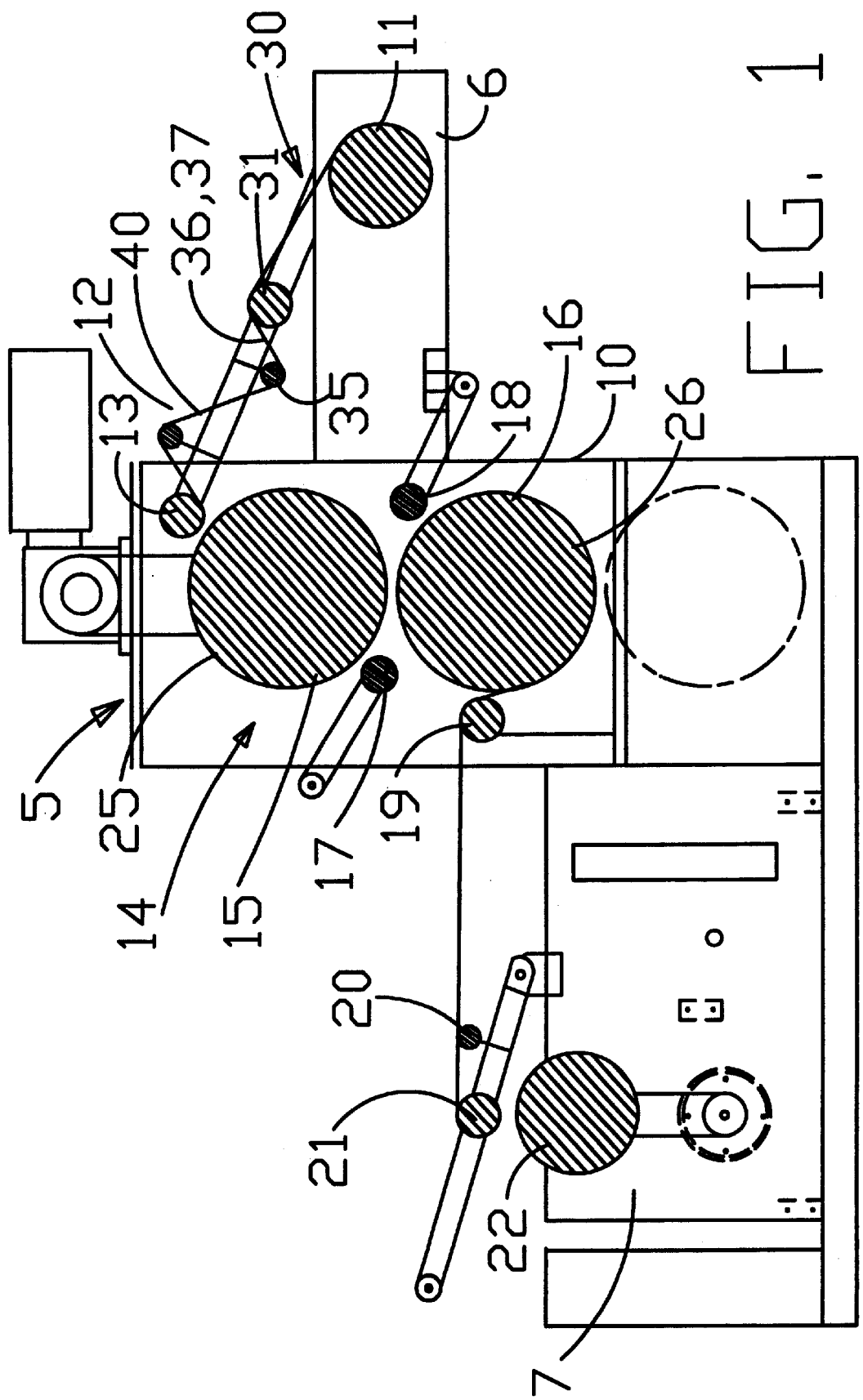
FIG. 1 is a diagrammatic side view of the high speed stretching apparatus according to one preferred embodiment of the invention.
Figure 2:
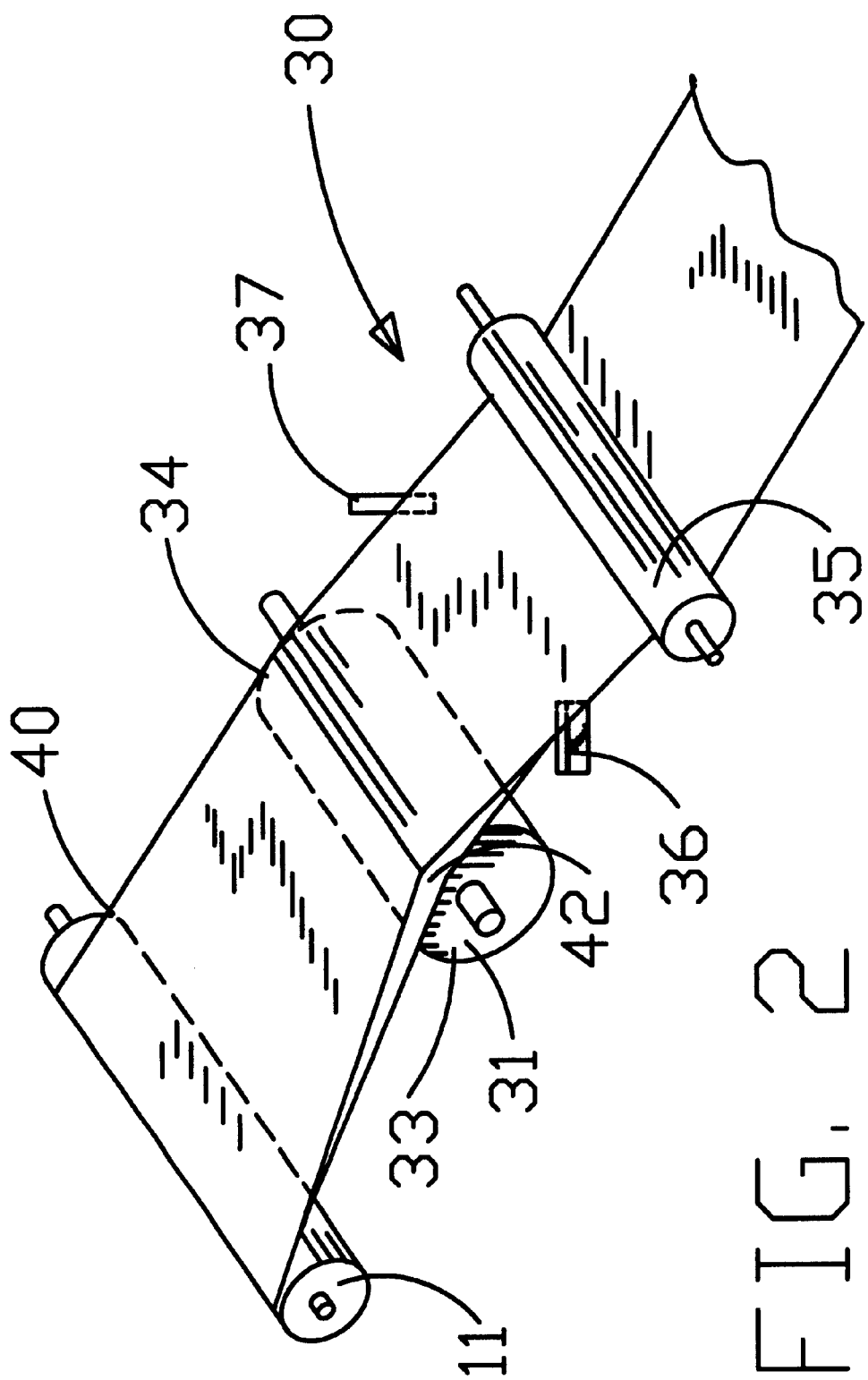
FIG. 2 is a diagrammatic perspective view of the folding apparatus according to one preferred embodiment of the invention.

Referring to FIGS. 1 and 2, an apparatus 5, a folding apparatus 30, and a high speed process for heating and stretching a film 40 while heat sealing folded edges 43 are disclosed.

Apparatus 5 comprises a frame 10. Folding apparatus 30 (FIG. 2) supplies apparatus 5 (FIG. 1) with a stretchable reinforced film 40 of any known composition. For example, such films are often composed of polyethylene, polyvinyl chloride, ethylene vinyl acetate, ethylene methyl acetate, and ethylene copolymers with higher alpha olefins.

Referring to FIG. 2, a folding apparatus 30, as disclosed in U.S. Pat. No. 5,565,222 to Scherer, the disclosure of which is incorporated herein by reference, can supply a reinforced film 40 to high speed stretching apparatus 5. Folding apparatus 30 can receive film 40 from a supply roll 11 or in-line from an extrusion apparatus (not shown). As shown in FIGS. 1 and 2, apparatus 30 includes a first folding roll 31 rotatably mounted to the inlet portion 6 of frame 10. First folding roll 31 has a length which is less than an initial width of film 40. As film 40 advances over first folding roll 31, edge portions 42 project outwardly beyond opposite ends 33 and 34 of first folding roll 31.

Second folding roll 35 is rotatably mounted to frame 10 and is positioned relative to first folding roll 31 to direct film 40 at an angle with respect to the initial path of film 40, maintaining film 40 under tension. As a result of said tension, edge portions 42 are folded downwardly through acute angles over opposite ends 33 and 34 of first folding roll 31, to begin the folding process.

Figure 3:
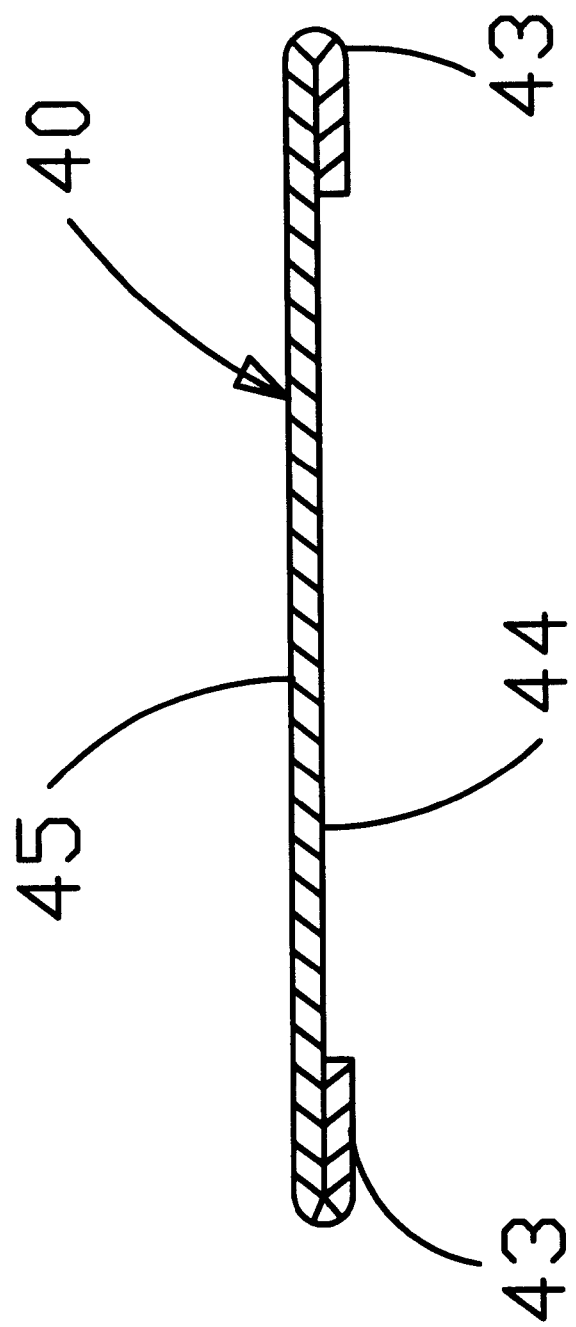
FIG. 3 is a diagrammatic cross-sectional view of the reinforced film produced by the apparatus of the invention.

Folding members 36 and 37 are positioned between first folding roll 31 and second folding roll 35 and mounted to frame 10. As film 40 advances across folding members 36 and 37, edge portions 42 are folded until edge portions 42 are in contact with a bottom surface 44 of film 40 to form edges 43 as shown in FIG. 3. Prior to stretching, formed edges 43 have a width of about 0.10 inch to about 1.0 inch, preferably about 0.25 inch to about 0.50 inch. Maintaining film 40 under tension ensures that film 40 and edges 43 remain in a substantially flat position.

Once edges 43 are formed, film 40 is stored on a roll or fed to apparatus 5 (FIG. 1) where film 40 is heated, heat-sealing folded edges 43, and stretched. A bridle mechanism 14 is connected to frame 10 and includes a first heated roll 15 and a second heated roll 16 operatively connected to frame 10. First heated roll 15 and second heated roll 16 are rotatably mounted to frame 10 and are preferably driven by independent motors at different speeds or, alternatively, by separate gear assemblies of different sizes driven by a common motor. Second heated roll 16 rotates at a speed greater than the speed at which first heated roll 15 rotates during operation of apparatus 5.

First heated roll 15 and second heated roll 16 preferably are made of chrome steel, but may be made of polished aluminum or other metals having a smooth surface. Rolls 15 and 16 may each have an outer diameter (OD) of at least 12 inches, preferably at least 18 inches. The width of first heated roll 15 and second heated roll 16 depend on the desired width of the film to be produced. In one embodiment rolls 15 and 16 each have a width of about 64 inches. The large outer diameter and smoothness of heated rolls 15 and 16 permit maximum contact with film 40 and heat sealing of its edges. Also, rolls 15 and 16 are positioned very close to each other and may, for instance, have a gap of about 0.01 inch between their closest points. By placing rolls 15 and 16 close together, the draw distance "d" is minimized. Referring to FIG. 1, the draw distance "d" refers to the length of film 40 between rolls 15 and 16 that does not touch either roll at any given instant. The draw distance "d" should be about 0.25–1.0 inch, preferably about 0.50–0.75 inch.

The combination of high surface contact and short draw distance minimizes neck-in. Neck-in is a reduction in the width of the film as the film is being stretched and is a result of poor contact between the film and the stretching members, too many stretching members, and/or large distances between successive stretching members. Neck-in of films made by the inventive process is less than 15%, preferably about 10% or less, for 12-inch wide films.

To achieve the surface smoothness, first heated roll 15 and second heated roll 16 may each have mirror surfaces 25 and 26, respectively. Outer mirror surfaces 25 and 26 may have a surface finish variation, that varies from a lowest point to a highest point, of about 0 microns to about 10 microns, preferably about 0 microns to about 5 microns. The smooth surface finish and the heat transferred from heated rolls 15 and 16 to film 40 permit greater adhesion of film 40 to heated rolls 15 and 16, and also improve the clarity of film 40. Therefore, film 40 can be fed through bridle mechanism 14 without slippage of film 40, resulting in high stretch ratios. Further, the heat minimizes film width fluctuation due to the higher coefficient of friction, absence of air, and adhesion between film 40 and outer mirror surfaces 25 and 26.

A first stretch nip 13 is rotatably connected to frame 10 and operatively connected to supply roll 11. First stretch nip 13 preferably is made of rubber and has an outer diameter of less than about 10 inches, suitably about 6 inches. First stretch nip 13 applies pressure, preferably about 2–10 pounds per linear inch (pli), suitably about 5 pli, against outer mirror surface 25 of first heated roll 15. First stretch nip 13 initiates the heat sealing of folded edges 43. Film 40 can be fed through first stretch nip 13 without slippage, thus preventing formation of wrinkles and/or holes in film 40.

In one preferred embodiment of this invention, a second stretch nip 17 and a third stretch nip 18 are rotatably connected to frame 10. Second stretch nip 17 and third stretch nip 18 are preferably made of rubber and have an outer diameter of less than about 8 inches, suitably about 4 inches. Second stretch nip 17 applies pressure, preferably about 2–10 pounds per linear inch ("pli"), suitably about 5 pli, against outer mirror surface 25 of first heated roll 15 and third stretch nip 18 applies similar pressure against outer mirror surface 26 of second heated roll 16. Second stretch nip 17 and third stretch nip 18 pinch film 40 against respective heated rolls 15 and 16 as film 40 is being stretched between rolls 15 and 16, thus minimizing slippage and further enhancing the heat sealing of folded edges 43.

Upon leaving heated roll 16, film 40 passes between heated roll 16 and roll 19, which travels at the same tangential speed as roll 16. A small pressure of about 2–10 pli is applied between rolls. A guide roll 20, lay-on roll 21 and core 22 are mounted to frame 10 downstream from rolls 16 and 19. Lay-on roll 21 and core 22 turn at a slower tangential speed than rolls 16 and 19, permitting film 40 to relax or shrink after leaving roll 19. The level of relaxation is less than 15% of the amount of stretching, preferably about 5% or less. For instance, a one-foot long film sample may be stretched by four feet to a length of five feet, and then relaxed (allowed to shrink) by 10% of four feet, to yield a final length of 4.6 feet. The annealed film is wound and stored on core 22, which periodically becomes full and is replaced.

In one preferred embodiment of this invention, a cast film having a thickness of about 23 microns comprising at least three layers having a first outer layer, a second outer layer and a core layer is heated and stretched. The first outer layer comprises a very low density polyethylene (hereinafter VLDPE) comprising copolymers of ethylene with an alpha-olefin, available from Dow Chemical as Dow SC4105. The first outer layer has a thickness of about 2.8 microns. The VLDPE polymer has a density of about 0.910 to about 0.911 g/cc and a melt index (MI) of 3.3 dg/min.

The second outer layer and the core layer comprise a linear low density polyethylene (LLDPE), which is a copolymer of ethylene and octene, available from Dow Chemical as Dow 2288. The second outer layer has a thickness of about 1.8 microns. The core layer has a thickness of about 18.4 microns. The LLDPE polymer in these layers has a density of about 0.917 g/cc.

In another embodiment, a blown film having a thickness of about 20 microns including at least three layers having a first outer layer, a second outer layer and a core layer is heated and stretched. The first outer layer having a thickness of about 1.6 microns includes a VLDPE plastomer, which can be a metallocene-catalyzed copolymer of ethylene with an alpha-olefin, preferably 1-octene, resulting in the first outer layer having a density of about 0.870 g/cc and a MI of 1–0 dg/min. A polymer having these properties is sold by the Dow Chemical Company as Dow EG8100. VLDPE plastomers have lower densities than, and are a different class of materials from, linear low density polyethylene (LLDPE). These plastomers are capable of use in biaxially oriented films having superior properties to comparable films with LLDPE's, including higher tensile strength and greater puncture resistance.

The core layer can be made of an LLDPE copolymer of ethylene with hexene or octene, having a melt index of 1.0, and a density of 0.917–0.920 grams/cc. Suitable polymers include Exxon LL3001 from the Exxon Chemical Company, and Dowlex 2045 from the Dow Chemical Company. The core layer has a thickness of about 16.4 microns.

The second outer layer includes an octene LLDPE having a density of about 0.925 g/cc and an MI of 1.9 dg/min. One such polymer is available from Dow Chemical as Dow LD535I. The second outer layer has a thickness of about 2.0 microns.

The invention is not limited to these particular stretch film polymers, film thicknesses, or film constructions. Other stretch films made of one or more layer combinations and polymers can also be processed with this invention, including materials such as ethylene vinyl acetate (EVA), branched low density polyethylene (LDPE), polypropylene, ethylene methylacrylate (EMA), other VLDPE's and LLDPE's, certain metallocene-catalyzed olefin polymers, and copolymers and terpolymers thereof.

The process of the invention can be described with reference to the apparatus. Referring again to FIGS. 1 and 2, in a high speed process for heating and stretching reinforced film 40 having edges 43, film 40 advances over a first guide roll 12 and is fed between first stretch nip 13 and first heated roll 15. First stretch nip 13 applies pressure, as explained above, against outer mirror surface 25 of first heated roll 15. Film 40 fully engages outer mirror surface 25 of first heated roll 15, free of wrinkles, holes and/or air pockets as a result of the pressure applied by first stretch nip 13 and the smoothness of outer mirror surface 25.

First heated roll 15 and second heated roll 16 are heated to a suitable temperature depending on the film composition. This temperature can range from about 100–350° F., suitably about 150–250° F. In the preferred film embodiments described above, a preferred temperature is about 200° F. to about 220° F. Heating of rolls 15 and 16 is accomplished by methods known to those skilled in the art, including internal steam, water, oil and electricity. Preferably, first heated roll 15 is heated to a temperature of about 220° F. As first heated roll 15 rotates, film 40 is heated to about 160° F. as film 40 is drawn around outer mirror surface 25. The heat transferred to film 40 as film 40 is drawn around first heated roll 15 promotes intermolecular fusion along edges 43.

Film 40 is then fed through second stretch nip 17, which applies pressure against outer mirror surface 25, after which film 40 separates from first heated roll 15. After a brief separation from both rolls 15 and 16, film 40 is fed through a third stretch nip 18 which applies suitable pressure against outer mirror surface 26 and film 40 adheres to second heated roll 16. As a result of the nipping, and of second heated roll 16 rotating at a speed greater than the speed at which first heated roll 15 rotates, film 40 is stretched as film 40 is transferred between first heated roll 15 to second heated roll 16.

The shortest distance between outer mirror surface 25 of first heated roll 15 and outer mirror surface 26 of second heated roll 16 is known as the roll gap. The roll gap may vary with film thickness and type, and is typically about 0.005–0.08 inch, suitably about 0.01–0.02 inch. The tangential distance between the point where film 40 separates from first heated roll 15 at second stretch nip 17 and the point where film 40 first contacts second heated roll 16 at third stretch nip 18 is known as the draw gap. The draw gap is quite short, and is suitably about 0.25–1.0 inch, preferably about 0.50–0.75 inch. The short draw gap decreases the neck-in associated with prior art stretching apparatuses. Also, the fact that film 40 is only drawn once means that the total draw gap is the same as the single-stage draw gap.

As second heated roll 16 rotates, film 40 is drawn about outer mirror surface 26 and is heated. Preferably, heated roll 16 is heated to a temperature within the same ranges stated above for heated roll 15. Film 40 advances over rotatable idler roll 19 and film 40 is wound onto core (film roll) 22. In one preferred embodiment, a second guide roll 20 and a lay-on roll 21 are operatively connected to idler roll 19 to prevent film slippage and further enhance heat sealing of folded edges 43, improving the winding process about core 22. Film 40 is allowed to relax up to about 20%, preferably in the range of 5% to about 15%, as film 40 advances between roll 19 and guide roll 20.

High stretch ratios, i.e., the ratio of the final, stretched length of film 40 to the initial, pre-stretched length of film 40, result from the greater adhesion of film 40 to first heated roll 15 and second heated roll 16. The "stretch ratio" is the ratio of the film length after stretching to the initial unstretched length. Thus, a stretch ratio of 2:1 means that a film increases 100% in length due to stretching, while a ratio of 1:1 means there is no (i.e., 0%) stretching. Stretch ratios resulting from the inventive process range up to about 5.5:1, and are preferably between about 2:1 to about 4.5:1. As a result, apparatus 5 and the process of this invention are capable of stretching film 40 by up to about 450%, to a length which is up to about 550% of its initial, pre-stretched length. Further, apparatus 5 and the process of this invention are capable of stretching film 40 at a finished line speed of about 1,000 fpm to about 3,000 fpm, preferably about 1,500 fpm to about 2,500 fpm. The pressure, heat and rapid stretch force applied to film 40 permanently heat seals the folded edges 43.

It is to be understood that variations and modifications of the present invention may be made without departing from the scope of the present invention. It is also to be understood that the scope of the present invention is not to be interpreted as limited to the specific embodiments disclosed herein. The scope of the invention is indicated in the appended claims, and all changes that fall within the meaning and range of equivalents are intended to be embraced therein.

We claim:

1. A process for making a film having permanently heat-sealed folded edges comprising the steps of:

advancing the film over a first folding roll having a length which is less than an initial width of the film, whereby a first edge portion and an opposing second edge portion of the film are folded downwardly through acute angles over a first end and a second end, respectively, of the first folding roll;

advancing the film having the first edge portion and the second edge portion across folding members;

folding the first edge portion and the second edge portion so that the first edge portion and the second edge portion are in contact with a surface of the film to form a first folded edge and a second folded edge;

advancing the film having the first folded edge and the second folded edge through a stretching apparatus comprising a first heated roll rotating at a first rotational speed and a second heated roll rotating at a second rotational speed greater than the first rotational speed; and heating the film to permanently heat seal the folded edges continuously along a length and a width of each folded edge and stretching the heated film to a final length at least about 200% of an initial length, wherein the heat sealing step includes passing the film through a first nip adjacent to a heated roll and passing the film through a second nip adjacent to a heated roll.

2. The process of claim 1, wherein the first folded edge and the second folded edge have a width of up to about 1.0 inch.

3. The process of claim 1, wherein the first folded edge and the second folded edge have a width of about 0.1 inch to about 1.0 inch.

4. The process of claim 1, wherein the first folded edge and second folded edge have a width of about 0.25 to about 0.5 inch.

5. The process of claim 1, wherein the film is passed through the hot stretching apparatus at a rate of at least about 1,000 feet per minute.

6. The process of claim 1, wherein the first heat roll and the second heat roll are heated to a temperature of about 150° F. to about 250° F.

7. The process of claim 1, wherein the heat sealing step further includes passing the film through a third nip adjacent to a heated roll.

8. The process of claim 7, wherein the heat sealing step further includes passing the film through a fourth nip adjacent to a heated roll.

* * * * *